(12) United States Patent
Riester et al.

(10) Patent No.: US 7,291,785 B2
(45) Date of Patent: Nov. 6, 2007

(54) CROSSMEMBER MODULE FOR A MOTOR VEHICLE

(75) Inventors: Christoph Riester, Oberding/Aufkirchen (DE); Guido Hofer, Weng (DE); Martin Feineis, Landshut (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 0 days.

(21) Appl. No.: 11/343,898

(22) Filed: Jan. 31, 2006

(65) Prior Publication Data

US 2006/0191704 A1 Aug. 31, 2006

(30) Foreign Application Priority Data

Feb. 1, 2005 (DE) ...................... 10 2005 004 605

(51) Int. Cl.
*B62D 25/08* (2006.01)
(52) U.S. Cl. ...................... 174/72 A; 296/70
(58) Field of Classification Search ............. 174/72 A; 296/70, 72, 193.02; 180/90
See application file for complete search history.

(56) References Cited

U.S. PATENT DOCUMENTS

| | | | | |
|---|---|---|---|---|
| 3,258,039 | A | * | 6/1966 | Ewalt ........................ 140/71 R |
| 5,126,507 | A | * | 6/1992 | Kirma ........................... 174/2 |
| 5,354,114 | A | | 10/1994 | Kelman et al. |
| 5,580,122 | A | | 12/1996 | Muehlhausen |
| 5,981,877 | A | * | 11/1999 | Sakata et al. ........... 174/153 G |
| 6,276,740 | B1 | * | 8/2001 | Mellor et al. ................. 296/72 |
| 6,325,440 | B1 | * | 12/2001 | Emmerich .................... 296/70 |
| 6,422,633 | B2 | * | 7/2002 | Neuss et al. .................. 296/70 |
| 6,601,902 | B1 | | 8/2003 | Rahmstorf et al. |
| 6,688,679 | B2 | | 2/2004 | Droulez |
| 6,921,127 | B2 | | 7/2005 | Feith et al. |
| 2001/0024047 | A1 | | 9/2001 | Neuss et al. |
| 2002/0153750 | A1 | | 10/2002 | Thomas et al. |
| 2004/0197528 | A1 | | 10/2004 | Roberts et al. |
| 2006/0028054 | A1 | | 2/2006 | Dettinger et al. |

FOREIGN PATENT DOCUMENTS

| | | |
|---|---|---|
| DE | 20008201 U1 | 5/2000 |
| DE | 10064522 A1 | 12/2000 |
| DE | 10240395 A1 | 9/2002 |
| DE | 10145357 C1 | 5/2003 |
| EP | 0886357 A2 * | 12/1998 |
| WO | WO 03/031746 A2 | 4/2003 |
| WO | WO03031746 A2 * | 4/2003 |

OTHER PUBLICATIONS

Abstract of EP0886357A2, Mohr, Dec. 23, 1998.*

* cited by examiner

*Primary Examiner*—Jinhee Lee
(74) *Attorney, Agent, or Firm*—Wolf, Greenfield & Sacks, P.C.

(57) ABSTRACT

A crossmember module for attachment under an instrument panel of a motor vehicle. The crossmember module includes a metal tube surrounded at least in part with plastic. The metal tube has a central, tubular cross-section and flattened ends. Each flattened end has a first mounting hole and a plastic tab that is injection molded onto each flattened end. The crossmember also has a groove-shaped plastic duct for guiding a wiring harness relative to the metal tube. Different receivers may optionally be molded on in one piece in the plastic enabling the connection of various adjacent components.

16 Claims, 3 Drawing Sheets

CROSSMEMBER MODULE FOR A MOTOR VEHICLE

BACKGROUND

1. Field

Aspects of the present invention relate to a crossmember module for attachment under the instrument panel of a motor vehicle.

2. Discussion of Related Art

Crossmembers of motor vehicles serve to accommodate various cockpit components and are usually manufactured by hydroforming a steel tube and welding on various receivers. These receivers include, for example, a receiver for the airbag, knee protectors, instrument panel, A-pillars, tunnel supports, and steering column. Generally, a relatively high number of production steps are necessary in order to provide the various attachments on a steel crossmember. Additionally, steel crossmembers tend to become distorted in the process of welding receivers on. Thus, care must be taken to prevent or minimize distortion of a steel crossmember when welding. Further, crossmembers designed as steel beams are relatively heavy, which has an adverse effect on fuel consumption.

To avoid some of the disadvantages of using steel, magnesium crossmembers are increasingly being used. Such magnesium crossmembers are manufactured by high pressure die casting. When using magnesium, attachments can be molded on at the same time the crossmember is die cast, thus saving weight. However, magnesium crossmembers take up a relatively large amount of space and are also at risk being distorted. Additionally, post-processing of magnesium presents several issues. In this regard, handling of magnesium and disposal of magnesium chips must be performed according to applicable regulations.

An instrument panel member which has an elongate, pod-shaped body and stabilizing inserts of metallic materials is described in DE 200 08 201 U1. These elements are joined together by means of an inner plastic ribbing on which is injection molded metal so as to form a metal and plastic composite component that is at least partially penetrated by at least one air duct. Retainers, brackets, and attachment points made of plastic that project outwards in relation to the body are injection molded in one piece together with the plastic ribbing.

A crossmember including a tube-like body made of metal is described in DE 100 64 522 A1. The crossmember has a plastic-lined internal cavity, forming duct walls made of plastic. The plastic-lined internal cavity is used to conduct air, so there is no need to provide any additional air-conducting components such as fan parts, air hoses or the like.

DE 102 40 395 A1 describes a crossmember for a motor vehicle with a pipe bend made either of a fiber-reinforced composite or a metal and plastic hybrid. The pipe bend is provided in the area between the left-hand A-pillar and the transmission tunnel. The area between the transmission tunnel and the right-hand A-pillar can be made completely out of plastic or likewise include a pipe bend made of a fiber-reinforced material or a metal and plastic hybrid construction.

Common to all the crossmembers referred to in the prior art is the attempt to reduce the weight as much as possible while maintaining the prescribed strength.

SUMMARY OF INVENTION

In one illustrative embodiment, crossmember module for attachment under an instrument panel of a motor vehicle is provided. The crossmember module includes a metal tube surrounded at least in part with plastic; and a groove-shaped plastic duct for guiding a wiring harness relative to the metal tube. The plastic duct is molded on the metal tube in one piece.

In another illustrative embodiment, a method of fabricating a crossmember module for a motor vehicle is provided. The method includes forming a metal tube; molding plastic at least partly on the metal tube; molding plastic duct on the metal tube; and molding a groove in the plastic duct. The duct is arranged to guide a wiring harness.

Various embodiments of the present inventions provide certain advantages. Not all embodiments of the invention share the same advantages and those that do may not share them under all circumstances.

Further features and advantages of the present inventions, as well as the structure of various embodiments of the present inventions are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
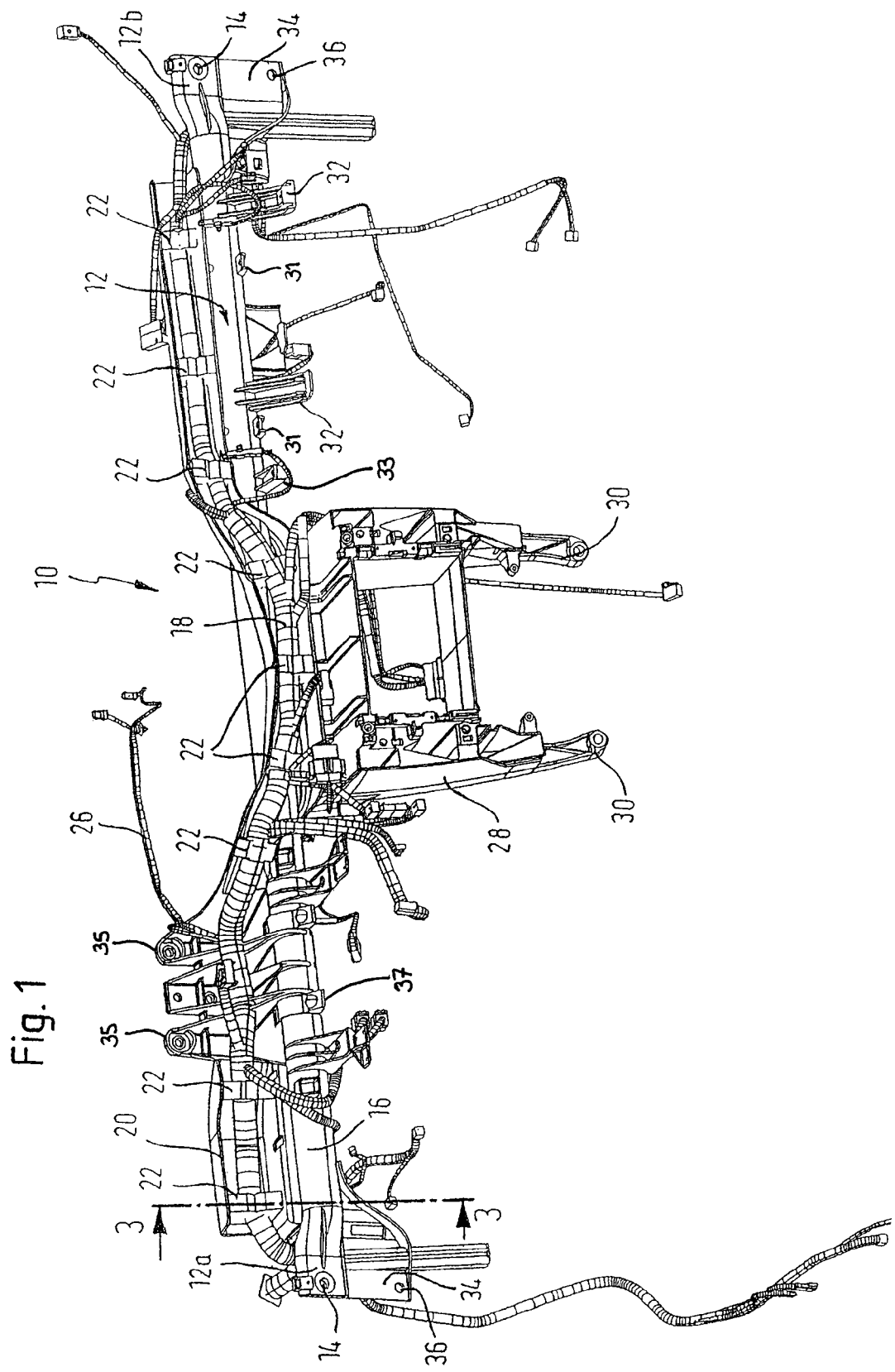
FIG. 1 represents a crossmember module according to one embodiment of the invention with an integrated wiring harness.

According to one aspect, a crossmember such as one for an automobile includes a metallic structure selectively covered with a plastic material. The plastic material may at least partially cover certain areas of the metal structure. The plastic material may form a channel for at least one wiring harness. The plastic may also be formed to provide attachment points, or receivers, for various components of a car, such as stereo components, a glove compartment, and a navigational unit. The crossmember may additionally provide additional connections to the A-pillars, steering column, and/or transmission tunnel. The list of receivers is not exhaustive and the present invention is not limited to the receivers listed. Other connections are contemplated so that a relatively integrated cross member may be manufactured in a relatively small number of steps, and which reduces or eliminates the problems of the prior art.

One aspect of the invention is directed to a crossmember which is easily produced and yet possesses a high level of integration. In one aspect, a crossmember requires little installation space and has a low weight. The crossmember may include a metal tube that is surrounded at least in part by plastic. A plastic duct to conduct a wiring harness may additionally be injection molded on the metal tube. Using this construction, the metal tube provides rigidity to the crossmember, while the plastic may be used wherever there is a reduced requirement for high strength. Thus, the metal tube provides high strength and rigidity where they are desirable. Examples of such places may include the receivers associated with the steering column and/or the airbag.

Generally, the metal tube between the A-pillars of a motor vehicle aids in stabilizing the shape of the passenger compartment and absorbs some of the forces exerted from the side in the event of an accident. However, the metal tube is also used to attach various components onto the car. In places which serve only for the attachment of various adjacent components, such attachments can be injection molded in plastic onto the metal component. For example, the attachment of the instrument panel, the glove compartment, and the wiring harness duct may include plastic.

In one embodiment, the plastic can be injected onto and around the metal tube in a single production step. The resulting hybrid construction may reduce the vibration mass and create a crossmember with a relatively high natural frequency. This may result in a crossmember module with high vibration comfort.

According to one embodiment, the metal tube is flattened at both ends and holes are located in both flattened ends. The holes, which may be drilled, punched or otherwise formed, serve as screw tabs for attaching the A-pillars when installing the crossmember module in the vehicle body. It may not be necessary to weld on any additional fixing brackets as is otherwise usual for attachment of the A-pillars in the prior art. As a result it may be possible to dispense with the extra production step of welding an A-pillar attachment onto the crossmember, thus also avoiding the associated distortion problems resulting from welding.

The crossmember module may have additional plastic tabs injection molded onto the flattened ends of the metal tube. These plastic tabs may include a through hole that provides an additional attachment point between the crossmember module and the A-pillars. The plastic tab with its additional attachment point may reduce rotation of the crossmember module around the longitudinal axis of the metal tube.

According to one embodiment, the metal tube comprises steel, although other suitable materials may be employed, as the present invention is not limited in this respect. In general the material of the metal tube may be selected with regard to the desired mechanical properties. Furthermore, depending on the type of vehicle, consideration may also be given to the installation space or weight to influence the selection of the material for the metal tube. Wear characteristics between the metal tube and the A-pillar may also influence the choice of material selected. The steel tube may be seamless or longitudinally welded, as the present invention is not limited in this regard. The external dimensions of the steel tube may be close-toleranced so that an injection tool may seal relatively tightly with the steel tube to achieve high production quality when injecting around the steel tube with plastic.

The plastic used may be fiber-reinforced. The plastic may be glass fiber-reinforced, such as PP GF30 or similar plastics. Use of a fiber-reinforced plastic may provide high mechanical strength with low weight. Although reinforcing the plastic may be desirable in some instances, the present invention is not limited in this respect, as non-reinforced plastic may be employed.

The crossmember module may have receivers for a passenger airbag 31, knee protectors 33 (one shown), a radio and/or a navigation unit 28. In one embodiment, these receivers are injection molded on the crossmember. Injection molding a receiver onto the crossmember may simplify installation of the corresponding component; however the present invention is not limited in this regard. The receivers may be injection molded in one piece onto the crossmember module alternatively or in combination with each other.

In one embodiment, a receiver 30 providing an attachment of the transmission tunnel is molded onto the crossmember. A transmission tunnel attachment may provide an additional fixing point between the crossmember and the vehicle body between the fixing points on each of the A-pillars. This construction may strengthen the overall composite and improve the crossmember module's vibration behavior.

In another embodiment, the crossmember module has an injection molded attachment molded thereon for fixing to the bulkhead of the cockpit 35. This attachment for fixing to the bulkhead, which may be molded as a unitary component, can be screwed to the bulkhead during installation of the crossmember module. In this manner it is possible to absorb at least some of the forces and moments generated by the weight of the steering wheel and transfer them directly into the body-in-white.

In one embodiment, the crossmember module includes areas on the metal tube which are not surrounded with plastic. These locations may provide areas to attach joining elements 37 such as pipe clamps. The joining elements may provide an attachment location for a screw plate of the steering column. By attaching the steering column in this manner, a welded joint with corresponding distortion problems in the vicinity of the steering column attachment may be avoided. To facilitate a secure attachment, the attachment may be made directly to the metal tube, i.e. at a point which is not surrounded with plastic.

According to one embodiment, the crossmember module includes foam elements. These foam elements surround the wiring harness guided in the plastic duct and can be inserted into the plastic duct. The foam elements may be dimensioned in such a way that they expand elastically in the plastic duct and exert pressure against the inner wall of the duct. The foam elements may be formed of polyethylene foam, foam rubber or similar materials, as the present invention is not limited in this respect. Polyethylene foam is inexpensive, while foam rubber has a high elasticity and friction coefficient which may reduce movement of the foam with respect to the plastic duct when the foam is expanded. Because of the foam's elasticity, a foam element may be able to accommodate different thicknesses of wiring harnesses. Wiring harnesses of varying thickness occur especially when using customer-specific cable assemblies. Because of the compressibility and resilience of foam, the wiring harness may be held inside the plastic cable duct. Foam elements may additionally prevent individual wires from rattling in the plastic duct, thus potentially eliminating the need for the time-consuming process of wrapping of the bundle of individual wires completely with adhesive tape.

Guiding grooves may also be injection molded in the plastic duct. The grooves may run substantially parallel to one another and provide a location for a foam element to be inserted. Providing grooves not only makes it easier to accurately position the foam elements during insertion, but also secures the desired position of the individual foam elements in the plastic duct.

According to one embodiment, when installed, the wiring harness in the plastic duct contains individual wires which are essentially only bundled together by fasteners such as cable ties. The cable ties may be located substantially only at the branches. In other words, as mentioned above, there may be no need for completely wrapping the bundle of individual wires. Instead, cable ties may only be necessary at points where individual wires or sublines branch off.

The plastic duct may be dimensioned in such a way that it can accommodate a wiring harness for the entire on-board electrical system. In this case the wiring harness also includes an engine compartment wiring harness. The engine wiring harness may be surrounded by a plate or grommet which may be dimensioned to fit an aperture in the vehicle's bulkhead. Thus, when installing the crossmember module, a wiring harness in the plastic duct (which includes the engine compartment wiring harness) may be installed. Furthermore, the engine compartment wiring harness may be guided into the engine compartment through a corresponding aperture in the bulkhead with the appropriate plate or grommet to seal the aperture in the bulkhead.

Turning to the illustrative embodiments shown in the figures, the crossmember module generally referred to by reference number 10 is shown in FIG. 1. Although the crossmember module 10 is depicted with a special mold shape, plastic duct design, and design of the individual attachment elements, it should be emphasized that the special geometry is only to be understood as an example.

Figure 2:
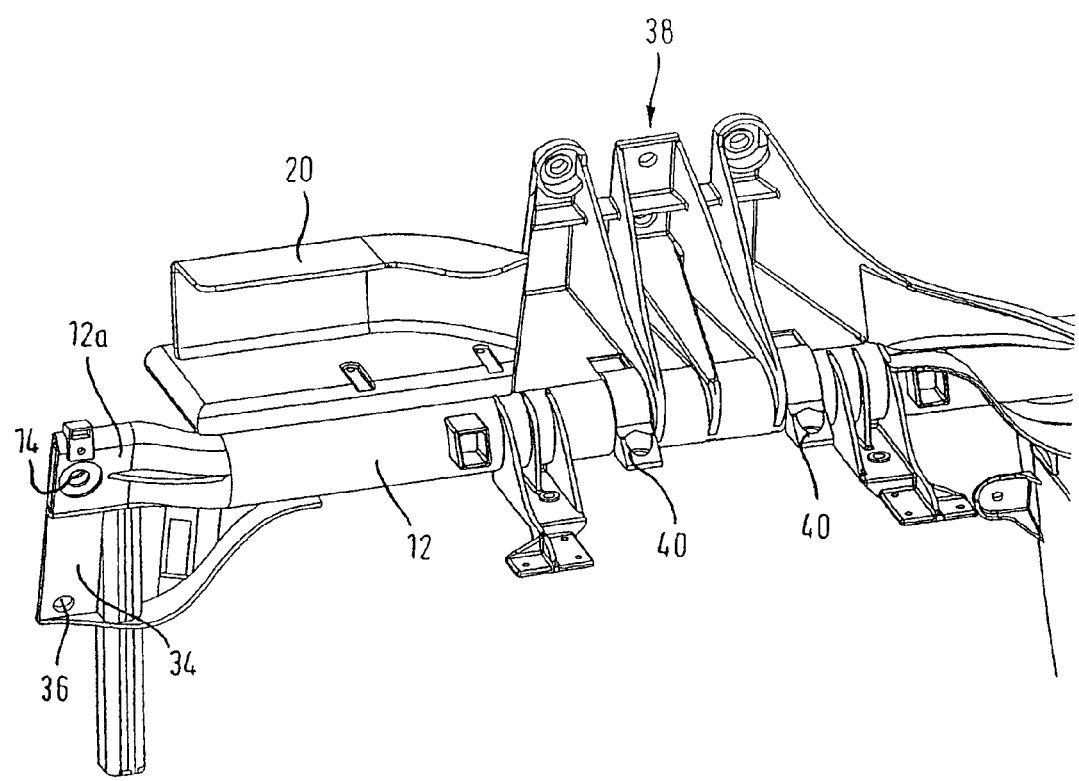
FIG. 2 shows a detailed view of the crossmember module of FIG. 1 in the vicinity of the steering column attachment.

The crossmember illustrated serves for attachment under the instrument panel of a vehicle and is joined to the A-pillars (not shown) of a motor vehicle during assembly. The crossmember module may comprise a seamless or longitudinally welded metal tube. The metal tube may be a steel tube, and may have close-toleranced external dimensions. In the embodiment depicted in FIG. 1, steel tube 12 is flattened on both its ends 12a and 12b. A detailed view of end 12a is shown in FIG. 2. Holes 14, which may be drilled, are located on the flattened ends 12a and 12b. The holes 14 serve as screw tabs for the A-pillars. Thus, the drilled holes 14 are located in places on steel tube 12 where the crossmember creates a rigid connection between the A-pillars. Steel tube 12 is substantially straight, i.e. steel tube 12 has no substantial curves at which bending deformations could arise due to compressive forces introduced into the steel tube via the flattened ends. The resistance to bending may enable the crossmember to absorb forces arising in the event of a side-impact.

In one embodiment, during manufacture of the crossmember, plastic 16 is sprayed or otherwise formed around steel tube 12. Forming the plastic on the crossmember module may take place in an injection molding plant, although other suitable manufacturing locations may be used, as the present invention is not limited in this regard. Fiber-reinforced plastic, e.g. glass fiber-filled plastic, may be used. The material PP GF30 is suitable for this purpose, but other glass fiber-filled plastics may additionally or alternatively be used. Steel tube 12 may be completely encased with injection molded plastic but also, as will be explained with reference to FIG. 2, in some areas may not be encased with injection molded plastic. If steel tube 12 is not completely encased with injection molded plastic, special requirements on the dimensional accuracy of the tools and of the steel tube may be made in the injection molding plant. Thus, providing a steel tube 12 with close-toleranced external dimensions may be desirable if dimensional accuracy of injection molding is desired.

Encasing steel tube 12 with injection molded plastic may provide a crossmember that has desirable mechanical characteristics and integral receivers for various components. The steel tube may provide high strength and stiffness where it is required, whereas the injection molded plastic may provide connection points for components as explained in greater detail later. In the same way it is also possible to use different plastics depending on the desired characteristics. For example, it might be possible to use a fiber-reinforced plastic such as a glass fiber-reinforced plastic only at those points where high mechanical requirements are placed on the plastic, while conventional plastic without fiber reinforcement could be used in other areas. In the crossmember module shown in FIG. 1, almost all the visible components with the exception of the electric cables are made in plastic. In this case, all the plastic parts can be injection molded on in a single production step.

In one embodiment, the crossmember module may be highly integrated. The wiring harness 18 may be located in a plastic duct 20, which is injection molded onto steel tube 12. The wiring harness is guided and protected in duct 20, and fixed by foam elements 22. The number of foam elements 22 (which may for example include polyethylene foam RG30) used in the crossmember assembly is only shown as an example in FIG. 1 and may, of course, vary according to the geometry of injection molded plastic duct 20 and also according to other requirements.

Figure 3:
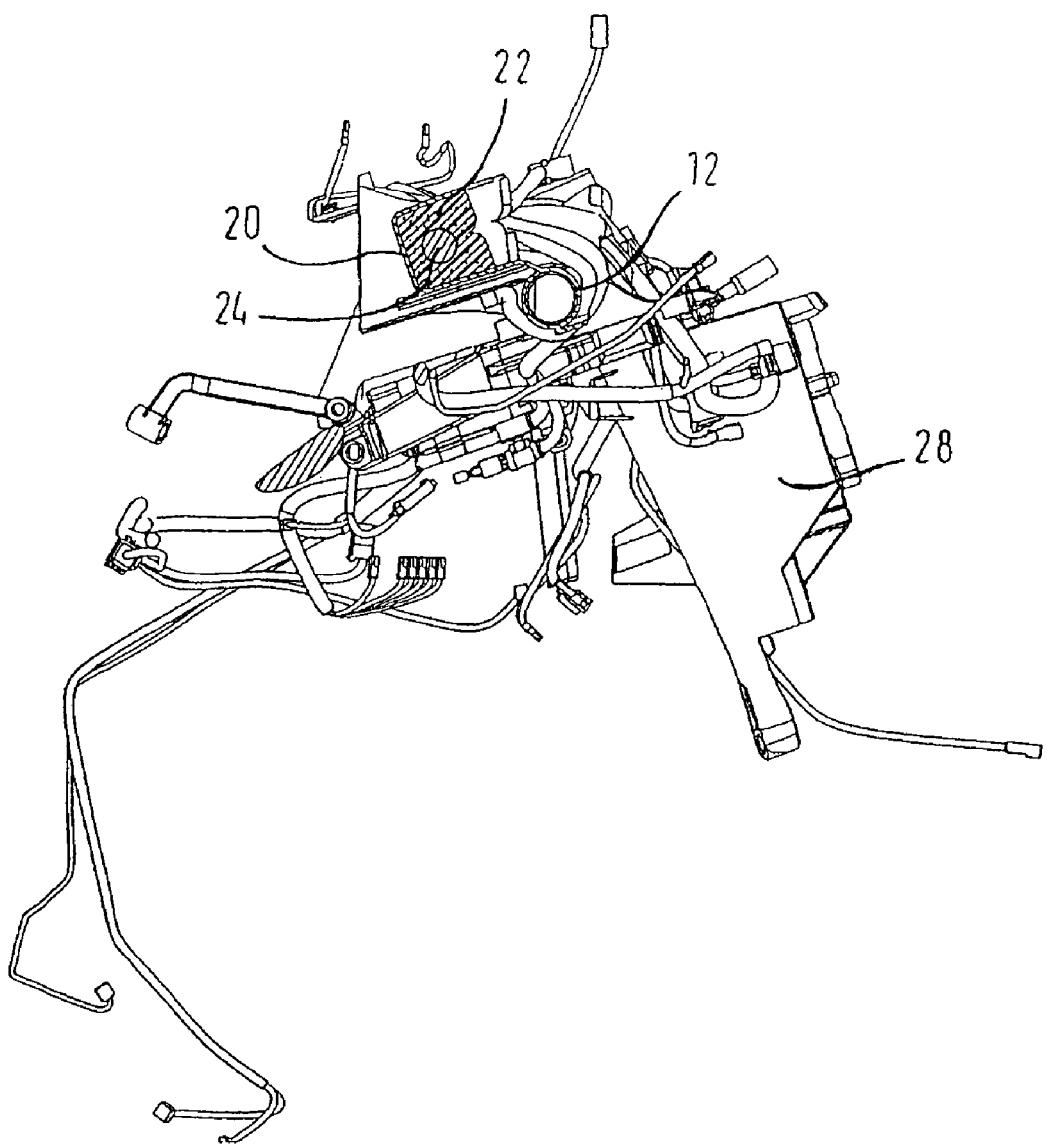
FIG. 3 represents a section leading through the foam element shown at section 3-3 in FIG. 1.

One embodiment of a foam element 22 in plastic duct 20 is shown in a sectional representation in FIG. 3. Foam element 22 through which the cable harness runs has an essentially centrally disposed aperture in the shape of bundle 24 of individual wires running through the foam element 22. This bundle 24 of individual wires is enclosed elastically by the elasticity of foam element 22. Plastic duct 20 is groove-shaped and open on one side. Foam element 22 is designed and configured such that it can be inserted into plastic duct 20. Once foam element 22 is placed in plastic duct 20, it can expand elastically so that a clamped joint is formed in plastic duct 20. Foam elements 22 may hold the wiring harness or bundle 24 of individual wires away from the inner walls of plastic duct 20 so as to prevent the individual wires from rattling. Thus it may not be necessary to completely wrap the bundle of individual wires with adhesive tape, although the wires are completely wrapped in the embodiment shown.

Besides foam elements 22 shown in FIGS. 1 and 3, other fixing elements may additionally or alternatively be used, such as commercially available cable ties or insertable, self-clamping stamped and bent parts.

The wiring harness 18 may include a plurality of sublines. In one embodiment, individual sublines such as cockpit wiring harness 26 branch off from wiring harness 18. In another embodiment, the engine compartment wiring harness is guided in plastic duct 20 and branches off from wiring harness 18. The engine compartment wiring harness is threaded through an aperture in the bulkhead, and the aperture in the bulkhead is subsequently sealed with a plastic plate or a grommet fixed to the cable assembly.

In one embodiment, a retaining bracket 28 is injection molded on the crossmember in one piece. The retaining bracket 28 has a special attachment geometry for receiving a radio unit or a navigation unit.

In another embodiment, transmission tunnel supports 30 are integrated in the plastic component. Transmission tunnel supports 30 may provide additional bodywork support which increases the crossmember module's overall stability in the vehicle. Furthermore, the transmission tunnel attachments may also provide a vibration support. Further connections 32 may include the receivers for mounting a glove compartment.

Additionally or alternatively, tabs 34 with holes 36 may be injection molded in the vicinity of flattened ends 12a and 12b of steel tube 12. Holes 36, which may be drilled, may serve to create an additional connection to the A-pillar.

In another embodiment, the steering column connection is provided. For this purpose the crossmember module has a connection 38 of injection molded plastic which is screwed to the bulkhead (not shown). In this way, forces and moments caused by the weight of the steering wheel may be absorbed and transferred directly into the body-in-white. In addition, pipe clamps 40 or other mechanical fasteners are provided which are fastened directly around parts of steel tube 12 that are not coated with injection molded plastic and on which the screw plate of the steering column (not shown) can be attached to the crossmember module.

Without having gone into detail about every connecting tab in the preceding description, it becomes clear from said description that the crossmember module according to the invention possesses a high level of integration in that a large number of plastic connections for various adjacent components are created in a single work step. The provision of plastic duct 20 which is additionally or alternatively injection molded onto the crossmember makes it possible to guide individual subline harnesses or a complete wiring harness in the crossmember module.

Although the figures show one embodiment of the crossmember, the present invention is not limited to containing all the described and/or pictured elements. For example, the crossmember may be coated entirely or in part with plastic. As noted above, the plastic may be injection molded as a single piece and it may contain one or more types of plastic. The crossmember may include one or more of the receivers described, and/or other types of receivers not shown in the figures could additionally or alternatively be used. Although the embodiment shown in the Figures has a specific shape and size for the crossmember and receivers, the present invention is not limited in this regard.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A crossmember module for attachment under an instrument panel of a motor vehicle, the crossmember module comprising:
    a metal tube surrounded at least in part with plastic, the metal tube having opposed walls that define a tubular cross-section at a central portion of the crossmember, the opposed walls transitioning, near each end of the crossmember module, to lie closer to one another and to define flattened ends of the crossmember module, each flattened end having a first mounting hole; and
    a plastic tab injection molded onto each flattened end, each plastic tab having a second mounting hole; and
    a groove-shaped plastic duct for guiding a wiring harness relative to the metal tube, wherein the plastic duct is molded on the metal tube in one piece.

2. The crossmember module according to claim 1, wherein the metal tube is formed of seamless steel.

3. The crossmember module according to claim 1, wherein the plastic is fiber-reinforced.

4. The crossmember module according to claim 1, wherein the plastic is fiber-reinforced in some areas.

5. The crossmember module according to claim 3, wherein the fiber-reinforced plastic comprises polypropylene reinforced with glass fibers.

6. The crossmember module according to claim 1, further comprising receivers for a passenger airbag molded on the metal tube.

7. The crossmember module according to claim 1, further comprising receivers for knee protectors molded on the metal tube.

8. The crossmember module according to claim 1, further comprising receivers for a radio or navigation unit on the metal tube.

9. The crossmember module according to claim 1, further comprising receivers for transmission tunnel attachments on the metal tube.

10. The crossmember module according to claim 1, further comprising an attachment molded on the metal tube for fixing the crossmember module to a bulkhead of a vehicle cockpit.

11. The crossmember module according to claim 1, further comprising at least one area on the metal tube which is not surrounded with plastic, and at least one joining element attached to the area on the metal tube which is not surrounded with plastic, wherein the joining element is arranged and configured to attach to a screw plate of the motor vehicle.

12. The crossmember module according to claim 1, further comprising a wire harness and foam elements, wherein the groove shaped plastic duct includes an open side that is configured to receive the wire harness and foam elements, the foam elements configured expand outwardly against inner walls of the duct, when inserted into the duct, to retain the wire harness in the duct and to prevent the wire harness from moving through the open side of the duct.

13. The crossmember module according to claim 12, wherein the foam elements comprise one of polyethylene foam and cellular rubber.

14. The crossmember module according to claim 12, further comprising guiding ribs injection molded in the plastic duct, wherein the ribs are substantially parallel to each other and arranged and configured to receive a foam element.

15. The crossmember module according to claim 1, wherein the motor vehicle has an on-board electrical system, wherein the plastic duct is dimensioned to accommodate a wiring harness for the entire on-board electrical system.

16. A motor vehicle with a crossmember module according to claim 1.

* * * * *